United States Patent [19]

Nakamura et al.

[11] Patent Number: 4,494,495
[45] Date of Patent: Jan. 22, 1985

[54] VARIABLE VALVE-TIMING APPARATUS IN AN INTERNAL COMBUSTION ENGINE

[75] Inventors: Norihiko Nakamura, Mishima; Toyokazu Baika, Susono; Toshio Miki, Yao; Minoru Kohigashi, Chiryu, all of Japan

[73] Assignees: Toyota Jidosha Kabushiki Kaisha, Toyota; Koyo Seiko Kabushiki Kaisha, Osaki, both of Japan

[21] Appl. No.: 434,711

[22] Filed: Oct. 15, 1982

[30] Foreign Application Priority Data

Jan. 12, 1982 [JP] Japan .............................. 57-002231

[51] Int. Cl.³ .................................................. F01L 1/34
[52] U.S. Cl. .................................. 123/90.15; 123/90.17
[58] Field of Search ................ 123/90.15, 90.16, 90.17; 464/1, 120

[56] References Cited

U.S. PATENT DOCUMENTS

| | | | |
|---|---|---|---|
| 1,632,223 | 6/1927 | Fey | 123/90.17 X |
| 2,682,260 | 6/1954 | Lantz | 123/90.17 |
| 3,626,720 | 12/1971 | Meacham et al. | 64/25 |
| 3,685,499 | 8/1972 | Meacham et al. | 123/90.15 |
| 3,978,829 | 9/1976 | Takahashi et al. | 123/90.17 |
| 4,279,131 | 7/1981 | Pringle | 464/120 X |

Primary Examiner—Michael Koczo
Assistant Examiner—Peggy A. Neils
Attorney, Agent, or Firm—Kenyon & Kenyon

[57] ABSTRACT

An apparatus for controlling valve timing in an internal combustion engine. The apparatus includes a pair of sleeves inserted into each other. One of the sleeves is connected to a camshaft of the engine. The other sleeve is connected to a timing pulley which is connected to the crankshaft of the engine. One of the sleeves has diametrically opposite slits while the other sleeve has diametrically opposite slits located adjacent to the respective slits in the one sleeve. The adjacent slits have central lines which are skewed with respect to each other. Roller-bearing units are arranged in the slits and are mounted on an axially slidable slider. Movement of the slider causes the generation of angular displacement between the sleeves so as to obtain a variable valve timing.

7 Claims, 5 Drawing Figures

Fig. 3-bis

VARIABLE VALVE-TIMING APPARATUS IN AN INTERNAL COMBUSTION ENGINE

DESCRIPTION OF THE INVENTION

The present invention relates to an apparatus for attaining variable control of valve timing in an internal combustion engine.

Variable control is used to obtain valve timings which are adapted to various engine operation conditions, such as low speed and high speed operation. Many types of such apparatuses have heretofore been proposed. The most typical type of such apparatus includes a mechanism by which the angular relationship between a crankshaft and a camshaft connected thereto is changed. The mechanism conventionally includes differential gears or planetary gears. A certain degree of backlash inevitably occurs due to the fact that a torque is generated in one direction when the valves are open, this direction being opposite to the direction in which a torque is generated when the valves are closed. This generated backlash causes the operational noise to increase and the transmission efficiency to decrease.

Thus, an object of the present invention is to provide a variable valve-timing control apparatus with no gear mechanism.

The present invention is now described with reference to attached drawings in which.

Figure 3:
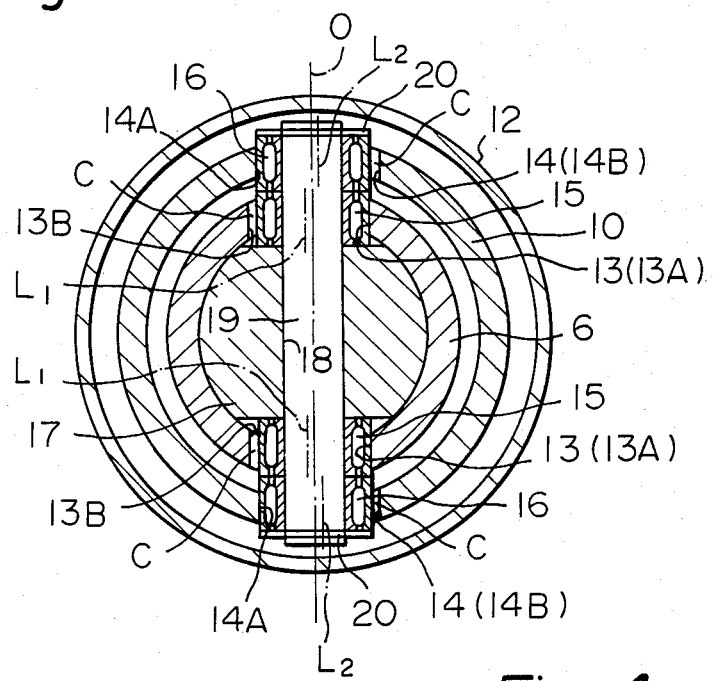
FIG. 3 is a cross-sectional view taken along the line III—III in FIG. 2.

FIG. 3-bis shows a cross-sectional view of one bearing unit; and

Figure 2:
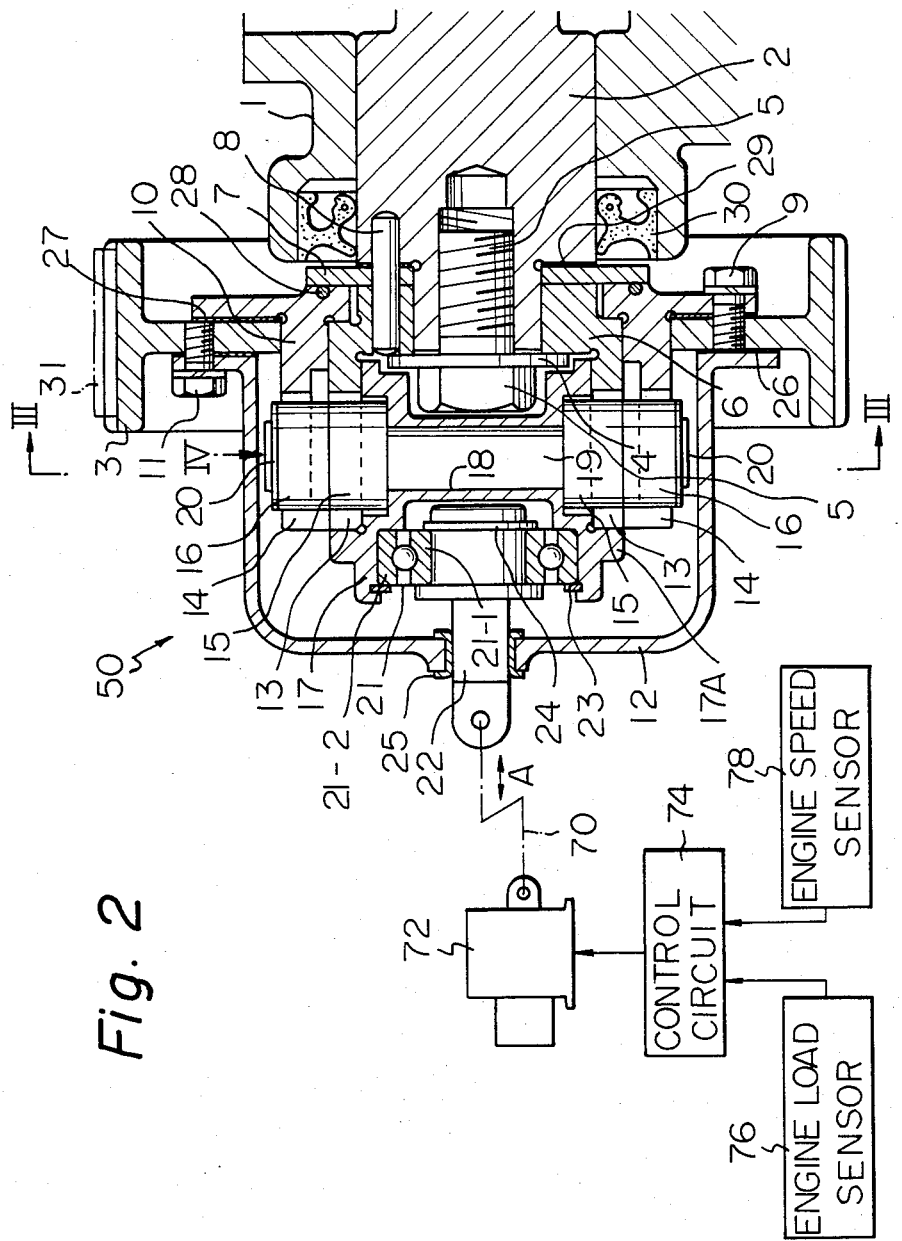
FIG. 2 shows a longitudinal cross-sectional view of the apparatus of the present invention with a drive system responsive to the operating condition of the engine.
Figure 4:
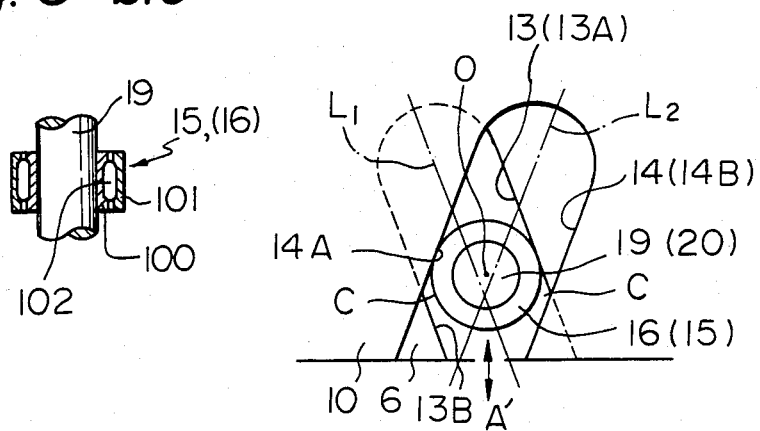

FIG. 4 shows a plan view seen along the line IV in FIG. 2.

Figure 1:
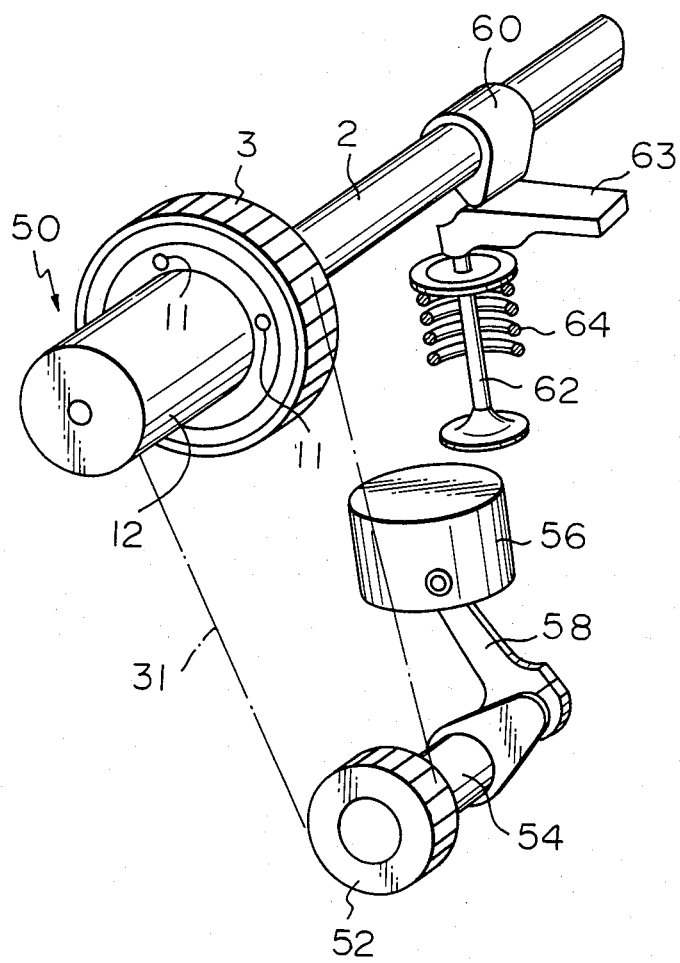
FIG. 1 is a perspective view indicating the connection of a crankshaft to a camshaft in an internal combustion engine.

In FIG. 1, reference numeral 2 denotes a camshaft. The camshaft 2 is rotatably supported on a cylinder head 1 (FIG. 2). Numeral 30 denotes an oil seal. To one end of the camshaft 2, a timing pulley 3 is connected via an apparatus for controlling the angular relationship between two rotating bodies of the present invention, this apparatus being generally shown by reference numeral 50. The timing pulley 3 is connected, by way of timing belt 31, to a timing pulley 52 on a crankshaft 54. A piston 56 is connected to the crankshaft 54 by connecting rod 58. A cam 60 is integrally formed in the camshaft 2. The cam 60 can cooperate with an intake or exhaust valve 62. A rocker arm 63 is arranged between the cam 60 and the valve 62. A spring 64 pushes the valve stem toward the cam 60 so that the valve is normally in the closed position.

The apparatus 50 is adapted for controlling the relative angular relationship between the camshaft 2 and the timing pulley 3 of the internal combustion engine, so as to control the timing of the valve 62. The apparatus includes, as shown in FIG. 2, an inner sleeve 6 into which a cam shaft 2 is inserted via a washer 7 and an annular gasket 29. The inner sleeve 6 is fixedly connected to the camshaft 2 by a washer 4 and a bolt 5. A lock pin 8 is inserted through the inner sleeve 6, the washer 7, and the camshaft 2 so that no relative rotation takes place between these parts.

To the timing pulley 3, an outer sleeve 10 is fixedly connected by a bolt 9 via an annular gasket 27 and a case 12 is fixedly connected by means of a bolt 11 via an annular gasket 26. The outer sleeve 10 is rotatably telescoped over the inner sleeve 6. An O-ring 28 in FIG. 2 is fitted to an annular groove in an end surface of the sleeve 10 facing the washer 7 so that the O-ring 28 always contacts the washer 7 to attain a fluid-tight relationship between the O-ring 28 and the washer 7.

The inner sleeve 6 has a pair of substantially diametrically opposed slits 13. The outer sleeve 10 has a pair of substantially diametrically opposed slits 14 located adjacent to the corresponding slits 13 in the inner sleeve 6. Each set of adjacent slits 13 and 14 are skewed with respect to each other, as shown in FIG. 4. Each slit 13 has facing edges 13A and 13B extending parallel to a central axis $L_1$. Each slit 14 has facing edges 14A and 14B extending parallel to a central axis $L_2$. Two sets of rollers 15 and 16, as abutment members, are located in the two sets of slits 13 and 14, respectively. The rollers 15 and 16 have a common axes O of rotation from which central axis $L_1$ and $L_2$ of the adjacent slits 13 and 14 are oppositely spaced. Thus, the rollers 15 and 16 contact the edges 13A and 14A, respectively, which are opposed to each other. The rollers 15 and 16 are spaced from the other opposed edges 13B and 14B, respectively, so that clearances C are provided between the rollers 15 and 16 and the corresponding edges 13B amd 14B. Due to this single contact arrangement of the rollers 15 and 16, backlash between the sleeve members 6 and 10 is mitigated when the rollers 15 and 16 move along the slits 13 and 14, respectively.

As shown in FIG. 3, the central axis $L_1$ of the diametrically opposite slits 13 is offset to one side of the axis O of the rollers while the central axis $L_2$ of the diametrically opposite slits 14 is offset to the opposite side of the axis O. Due to this arrangement, no backlash takes place even if the camshaft is loaded in either direction because the rollers 15 are pressed on one side by the slit edges 13A, and the rollers 16 are pressed on the opposite side by the slit edges 14A.

The rollers 15 and 16 are mounted on a common shaft 19 passing through a diametral bore 18 formed in a slider 17. Each of the rollers 15 and 16 has an inner race 100 slipped onto the shaft 19, an outer race 101 contacting the slit 13 or 14, and a plurality of needles 102 arranged between the inner and the outer races (FIG. 3-bis). Clips 20 prevent the rollers 15 and 16 from sliding off the shaft 19.

As shown in FIGS. 2 and 3, the slider 17 is axially slidably inserted into the inner sleeve 6. As shown in FIG. 2, axial movement of slider 17 to the right is limited by abutment of a projection 17 against the outer end of sleeve 6, and movement to the left is limited by abutment of the outer end of the slider against the inside of the case 12. A bearing unit 21 comprising an inner race 21-1 and an outer race 21-2 is arranged inside the slider 17. The outer race 21-2 is fixed to the slider 17 with a clip 23. Reference numeral 22 denotes an operating rod to which the inner race 21-1 of the bearing unit 21 is fixedly connected with a clip 24. The operating rod 22 is sealingly inserted into an annular member 25 which is connected to the case 12. The operating rod 22 is connected via a link 70 to an actuator 72 which is operated by a control circuit 74. Various engine operational condition sensors, such as engine load sensor 76 and engine speed sensor 78, are connected to the control circuit 74.

A lubricating oil is housed in the case 12 and is prevented from leaking therefrom by the parts 25, 26, 27, 28, and 29.

Now an operation of the apparatus according to the present invention is described. The rotational movement of the crankshaft 54 is transmitted to the timing pulley 3 via the timing belt 31. Thus, the outer sleeve 10 rotates together with the timing pulley 3 so that a force is applied to the rollers 16 to rotate the rollers about the axis of the camshaft 2. As a result, the slider 17, together with the roller shaft 19, also rotates about the axis of camshaft 2. This rotational movement of the roller shaft 19 is transmitted to the slits 13 of the inner sleeve 6 via the rollers 15 therein, thereby causing the camshaft 2 to rotate. Thus, transmission of the rotational movement from the crankshaft 54 to the camshaft 2 takes place. In other words, the timing pulley 31 and the camshaft 2 rotate integrally with each other so that the predetermined angular relationship between the crankshaft 54 and the camshaft 2 is maintained. Thus, the valve 62 cooperating with the cam 60 on the camshaft 2 operates within a predetermined angle range of the crankshaft 54 to open or to close the valve 62. Thus, the predetermined valve timing is obtained.

When it is necessary to change the valve timing due to a change of the operational condition of the engine detected by the sensors 76 and 78, the control circuit 74 connected to the operational condition sensors 76 and 78 issues a signal to the actuator 72, causing the operating rod 22 to move, as shown by the arrow A in FIG. 2. As a result, the slider 17 moves in the same direction as the operating rod so that the rollers 15 and 16 in the slits 13 and 14, respectively, move as shown by the arrow A' in FIG. 4. Due to the arrangement of the slits 13 and 14, which are skewed with respect to each other, the linear movement of the rollers 15 and 16 is changed to a relative angular movement between the inner and the outer sleeves 6 and 10. Thus, the relative angular position between the crankshaft 54 and the camshaft 2 is changed. This means that the valve timing is varied.

It should be noted that the degree of angular displacement between the two rotating bodies is a function of the stroke of the operating rod 22. Thus, the stroke of the rod 22 is controlled so that a predetermined change of the valve timing is attained.

As will be clear from the above, the present invention makes it possible to obtain variable valve timing without the use of a gear mechanism. By offsetting the axes of skewed slits 13 and 14 on opposite sides of a diametral axis of respective inner and outer concentric sleeves, backlash is prevented. Therefore, the operational noise is decreased while a high transmission efficiency is maintained. In addition to this, the present invention is advantageous in that only a small force is necessary to vary the valve timing due to the fact that the frictional force occurring in the slits 13 and 14 is small since the rollers 15 and 16 are moved therein in a rotating condition.

Many modifications and changes may be made by those skilled in this art without departing from the scope of the present invention.

What is claimed is:

1. An apparatus for controlling relative angular relation between two interconnected bodies which are rotatable about a common first axis, the apparatus comprising:

an outer sleeve member fixedly connected to one of the bodies coaxial with said first axis;

an inner sleeve member fixedly connected to the other of the bodies coaxial with said first axis, said inner sleeve member being inserted into said outer sleeve member, said outer sleeve member having a first elongated slit and said inner sleeve member having a second elongated slit overlapping the first slit in the outer sleeve member, the overlapping first and second slits being skewed with respect to each other;

abutment means disposed in each of said first and second slits, said abutment means comprising first and second rollers arranged in said first and second slits, respectively, so that each roller is in contact with the corresponding slit and means for mounting each of said first and second rollers for free and independent rotation about a second axis transverse to the first axis;

a slider on which said abutment means are fixed, said slider being movable parallel to said first axis for causing relative angular displacement between the inner and outer sleeve means due to longitudinal movement of the abutment means in said first and second slits;

means for moving the slider parallel to the first axis; and wherein said first sleeve member has a third elongated slit circumferentially spaced from said first slit; said second sleeve member has a fourth elongated slit circumferentially spaced from said second slit; and said abutment means includes third and fourth rollers arranged in said third and and fourth slits, respectively, so that each roller is in contact with the corresponding slit, and means for mounting each of said third and fourth rollers for free and independent rotation about at third axis transverse to the first axis and making a fixed angle with the second axis, said slits being angularly offset with respect to said abutment means such that the first and third rollers always contact the respective first and third slits on one side only of the angle between the second and third axes and the second and fourth rollers always contact the respective second and fourth slits on the other side only of the angle between the second and third axes, thereby eliminating backlash between the inner and outer sleeves.

2. An apparatus according to claim 1, wherein the angle between the second and third axes is 180 degrees.

3. An apparatus according to claim 1, further comprising means for permitting only limited movement of the slider parallel to the first axis.

4. An apparatus according to claim 1, wherein said means for moving the slider parallel to the first axis comprises an actuator and an elongated link mechanism having one end connected to the actuator and an opposite end connected to the slider.

5. A system for transmitting, in an internal combustion engine, rotation of a crankshaft to a camshaft, the system comprising:

a driven member having a first axis of rotation coinciding with an axis of rotation of the camshaft;

a power-transmitting member for connecting the crankshaft to the driven member;

an outer sleeve member fixed to one of the driven member and the camshaft;

an inner sleeve member fixed to the other of the driven member and the cam shaft, the inner and outer sleeve members being coaxial with the first axis and the inner sleeve member being inserted into the outer sleeve member, said inner and outer sleeve members having two sets of elongated first and second slits, one set of said slits being circumferentially spaced from the other set, said first slit of each set being located in the first sleeve member, said second slit of each set being located in the second sleeve member adjacent to the first slit of the same set, the first and second slits of each set being skewed with respect to each other, and at least one of said slits being skewed with respect to said first axis;

abutment means arranged in each set of slits, said abutment means comprising two corresponding sets of first and second rollers arranged in said first and second slits, respectively, of each set, so that the rollers are in contact with the corresponding slits, and means for mounting said first and second rollers for free and independent rotation about a respective second axis transverse to said first axis, the two first slits being arranged so that they contact the corresponding first rollers on only one side of said second axis, and the two second slits being arranged so that they contact the corresponding second rollers on only the other side of said second axis, thereby eliminating backlash between the inner and outer sleeves;

a slider on which said means for mounting the first and second rollers are fixed, said slider being mounted for movement parallel to said first axis for causing relative angular movement between the inner and outer sleeve member due to corresponding movement of the abutment means in the first and second slits;

drive means for moving the slider parallel to the first axis; and means responsive to operating conditions of the engine for operating the drive means to control the relative angular position of the camshaft with respect to the crankshaft so as to obtain variable valve timing.

6. A system according to claim 5, further comprising means for permitting only limited movement of the slider parallel to said first axis.

7. A system according to claim 5, wherein said means responsive to operating conditions of the engine for operating the drive means comprises sensor means for detecting the operating conditions of the engine and control means responsive to signals from the sensor means for providing signals directed to the drive means.

* * * * *